May 30, 1972     J. D. ALBEANESE III     3,666,340

INSULATED AIR-TIGHT CONTAINER FOR INSTRUMENTS

Filed July 1, 1970

INVENTOR
JOSEPH D. ALBEANESE, III

May 30, 1972   J. D. ALBEANESE III   3,666,340
INSULATED AIR-TIGHT CONTAINER FOR INSTRUMENTS
Filed July 1, 1970   5 Sheets-Sheet 2

INVENTOR
JOSEPH D. ALBEANESE, III

BY *Frank P. Cyr*

ATTORNEY

May 30, 1972  J. D. ALBEANESE III  3,666,340
INSULATED AIR-TIGHT CONTAINER FOR INSTRUMENTS
Filed July 1, 1970  5 Sheets-Sheet 3

INVENTOR
JOSEPH D. ALBEANESE, III

BY
ATTORNEY

May 30, 1972   J. D. ALBEANESE III   3,666,340
INSULATED AIR-TIGHT CONTAINER FOR INSTRUMENTS
Filed July 1, 1970   5 Sheets-Sheet 5

INVENTOR
JOSEPH D. ALBEANESE, III
BY *Frank P. Cipa*
ATTORNEY

# United States Patent Office 3,666,340
Patented May 30, 1972

3,666,340
INSULATED AIR-TIGHT CONTAINER FOR
INSTRUMENTS
Joseph D. Albeanese III, 4409 Lake Villa Drive,
Metairie, La. 70002
Filed July 1, 1970, Ser. No. 51,489
Int. Cl. A47b 81/00
U.S. Cl. 312—283                                    5 Claims

ABSTRACT OF THE DISCLOSURE

An insulated, air-tight container designed specifically for housing instruments, such as meters, gauges, etc., which are employed in an environment where such instruments would normally be exposed to detrimental atmospheric effects causing corrosion, etc., of the working parts of such instruments.

BACKGROUND OF THE INVENTION

In certain industries as well as in certain areas measuring instruments and the like are required to determine certain functional workings of various type apparatus and quite frequently such measuring instruments are exposed to detrimental environmental atmosphere which often causes the measuring instrument to become corroded, thus impairing the proper operation of the instrument with resultant replacement thereof or the removal of the instrument and dismantling of the parts thereof for proper cleaning procedures to remove the rust from the same and to subsequently reassemble and reinstall the same in its proper position. Either of the above procedures are costly and time consuming, particularly if the instrument has to be disassembled and subsequently reassembled after the parts have been cleaned free of any corrosion.

While the improved container has numerous areas where the same may be advantageously employed for housing various type instruments and to guard against corrosion of the parts thereof, one such area which may be pointed out with particularity is in the oil field industry where numerous various type measuring and testing instruments are employed to detect and indicate the working conditions of certain equipment employed in the drilling and pumping operations of an oil well. As is known, detrimental sulphurous fumes are ever present in and around an oil well operation and these fumes cause the working parts of a measuring or testing instrument to quickly become corroded, thus necessitating their replacement or repair if accurate readings are to be obtained by an observer. Another area where measuring and testing instruments are frequently employed is on board ships where the instruments are exposed to salt air, again with resultant corrosion of the parts of such instrument. Also, in certain industries measuring and testing instruments are exposed to dust laden air and, here again, dust particles will infiltrate the instrument and working parts thereof and in due time impair the efficient operation of the instrument. In certain instances, meters and the like are mounted exteriorly of a building structure and are thus exposed to the elements with ultimate corrosion thereof, thus necessitating the replacement thereof by reason of malfunctioning of the meter due to the corrosive action of rain water and the like.

As can be appreciated, it thus becomes imperative that a housing or container be provided to house such measuring and testing instruments so as to guard them against the deleterious effects of the aforesaid elements and to insure for their continued operation notwithstanding the environmental conditions where such intruments are installed.

With the above in mind, it is the primary object of the invention to provide a housing or container which is adapted particularly to house various types of measuring and testing instruments and to retain them therein through suitable means which will insure the exclusion of any outside deleterious elements such as rain water, corrosion inhibiting fumes, dust and the like.

Another object of the invention is to provide a container adapted particularly to house measuring and/or testing instruments with an adjustable mounting surface positioned interiorly of the container which will enable the mounting therein of various type instruments.

Another object of the invention is to provide a transparent fixed partition at or near the upper portion of the container to thus enable one to view the instruments mounted on an adjustable mounting surface within the container.

Another object of the invention is to provide a hinged cover for the container with means between the cover and the walls of the container which will insure the exclusion of deleterious elements from the interior of the container and to likewise provide a suitable gasket means interposed between the transparent partition and the walls of the container to insure the exclusion of any deleterious elements from reaching into the portion of the container which houses the measuring and/or testing instruments.

Another object of the invention is to provide a bottom door for the container whereby access may be obtained to this portion of the container thus enabling one to service any of the instruments mounted on the adjustable mounting surface.

Another object of the invention is to provide a compartment within the cover for the container which will afford ample space for the storage of various components for the instruments housed within the container.

Another object of the invention is to provide a novel manner of mounting a resilient gasket between certain parts of the container which will insure for the exclusion of any deleterious elements from within the confines of the container but which will also retain its resiliency, thus prolonging the useful life of the gasket in the performance of its intended function.

Another object of the invention is to provide a plurality of externally threaded studs extending between the adjustable mounting surface and the walls and bottom cover of the container to thus enable the container and instruments mounted therein to be readily mounted on to an existing structure by extending the threaded studs through suitable openings formed in the existing structure and locking the same thereto by the application of suitable nuts to the threaded studs.

The above and other novel features of the invention will appear more fully hereinafter from the following description when taken in conjunction with the accompanying drawings. It is expressly understood that the drawings are employed for purposes of illustration only and are not designed as a definition of the limits of the invention, reference being made for this purpose to the appended claims.

DESCRIPTION OF THE DRAWINGS

In the drawings wherein like reference characters indicate like parts.

DESCRIPTION OF THE PREFERRED EMBODIMENTS

Briefly, and in general terms, the container of the present invention involves a novel combination of parts employed in the formation of an enclosure which will insure the exclusion of any deleterious elements from within the confines of the container, thus enabling the container to house various type equipment therein such as measuring and testing instruments and the like, and with the container rendered substantially air-tight in a manner to be described hereinafter, the instruments mounted within the container will not be affected by any outside deleterious elements, thus insuring the proper working of such instruments even in environmental areas where, but for the container of the present invention, such instruments would quickly corrode or become laden with dust and the like with resultant repair or replacement of the instrument.

Figure 1:
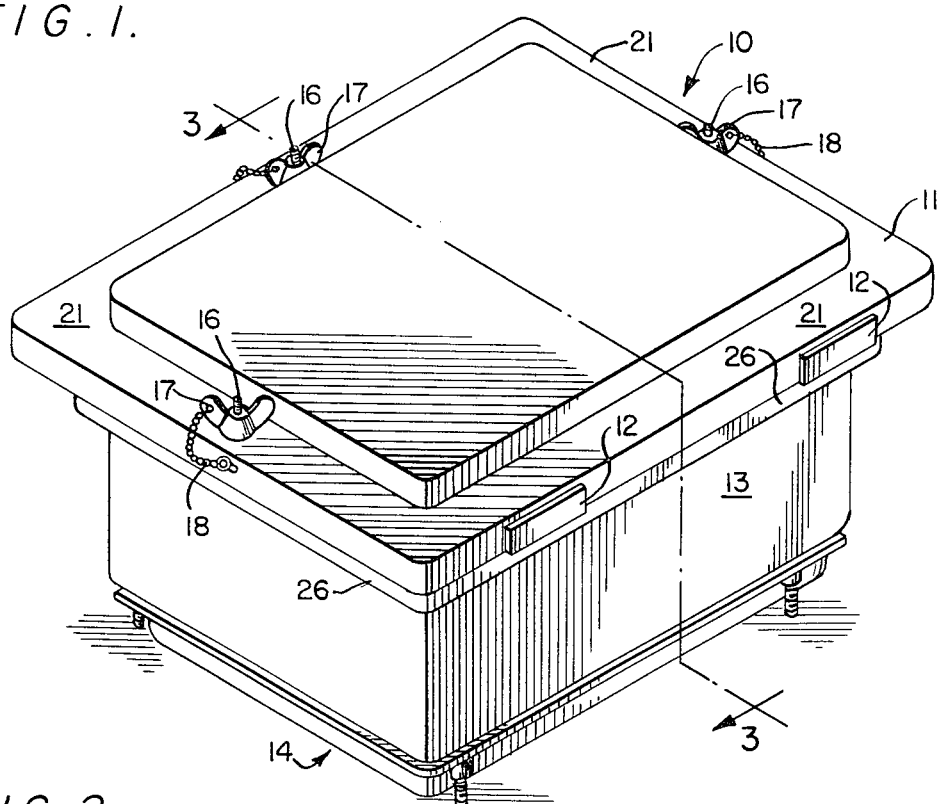
FIG. 1 is a perspective view of the container.

Referring now to tthe drawings, there is shown in FIG. 1 thereof a container 10 constructed of a general rectangular design although it is obvious the same could be made of other external design such as square and the like. The container 10 comprises a cover 11 hinged as at 12 to rear wall 13. Front and side walls form part of the enclosure and a bottom cover indicated generally by reference character 14 is secured to the container walls in a manner to be more fully described hereinafter.

Figure 2:
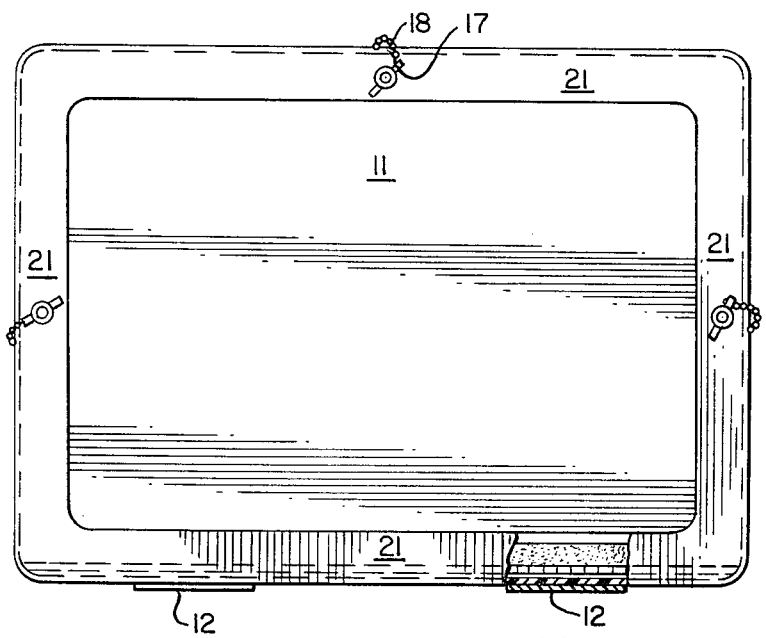
FIG. 2 is a top plan view of the container with parts in section.
Figure 3:
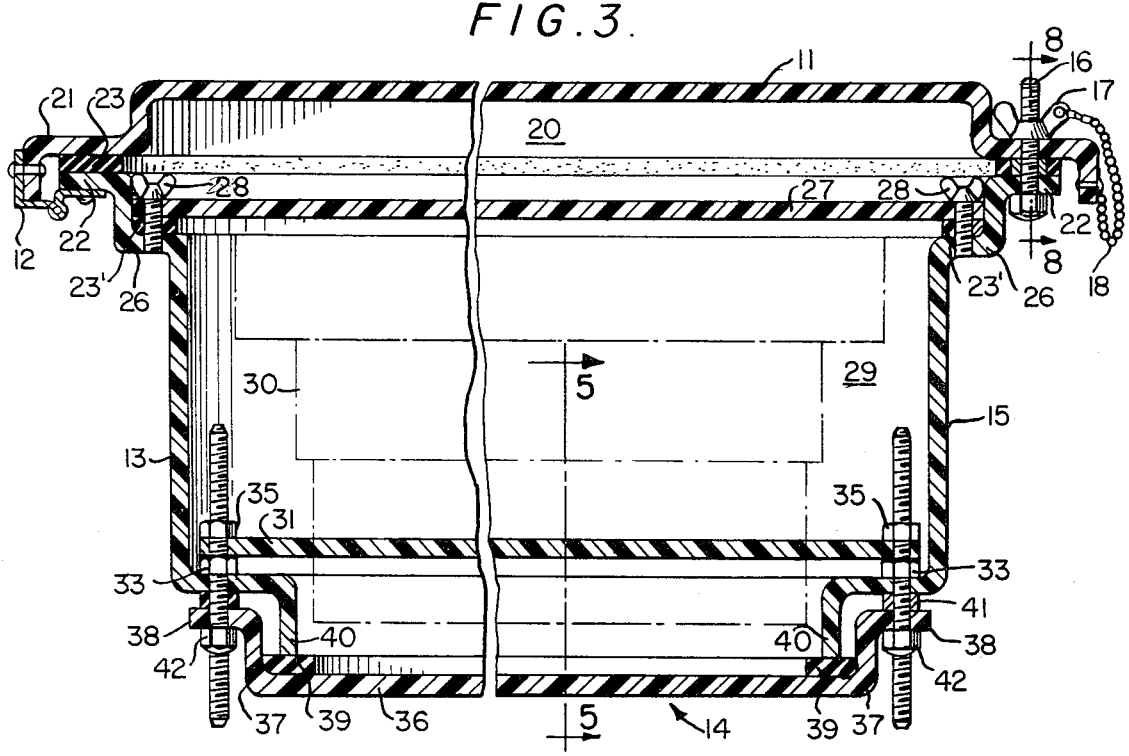
FIG. 3 is a section taken on line 3—3 of FIG. 1, looking in the direction of the arrows.
Figure 4:
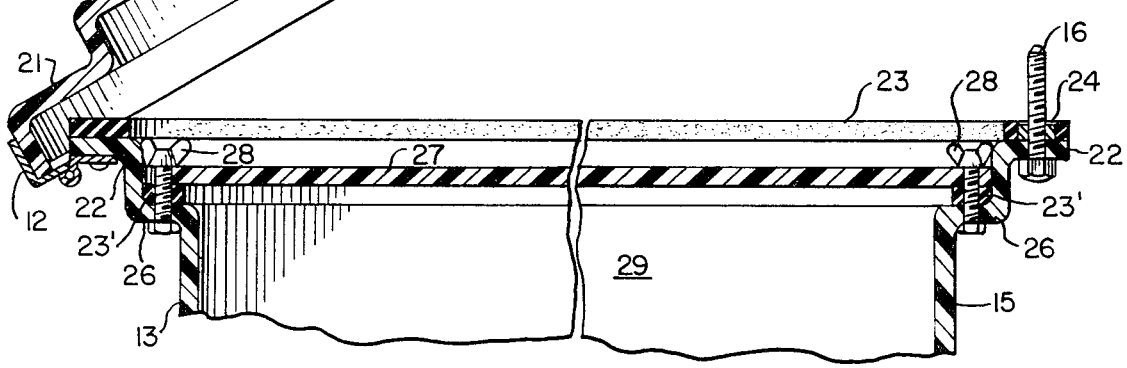
FIG. 4 is a sectional view showing the hinged cover partly opened together with the transparent plate which is mounted at the upper portion of the container.

Referring now more particularly to FIGS. 3 and 4 of the drawings, there is shown therein the cover 11 which is hinged as at 12 to the rear wall 13 and the cover is detachably secured to the upper edge of front wall 15 by means of a bolt and wing nut arrangement shown as at 16 and 17. As shown in FIGS. 1 and 2, the bolt and wing nut arrangement is also provided at the side walls of the container. The wing nuts are held captive to the container by means of tie chains 18 which extend from the nuts to plates 19 which are secured in any known manner to the walls of the container. It should be pointed out at this time that the walls and top and bottom cover of the container are preferably constructed of layers of Fiberglas material which have been treated with a suitable adhesive agent to retain the Fiberglas in its intended condition to form the container. While I have set forth the use of Fiberglas as the preferred material to be used in the formation of the container, it is obvious that other type materials could be used, suffice it to say that such other material should be air impervious and one not subject to the corrosive action of various type environmental elements. Preferably, the inner and outer walls of the container, including the covers therefor, are coated with a suitable lacquer to increase the impermeability of the container although if the material employed to form the container results in a substantially air-tight enclosure, the application of a lacquer may be dispensed with.

Figure 7:
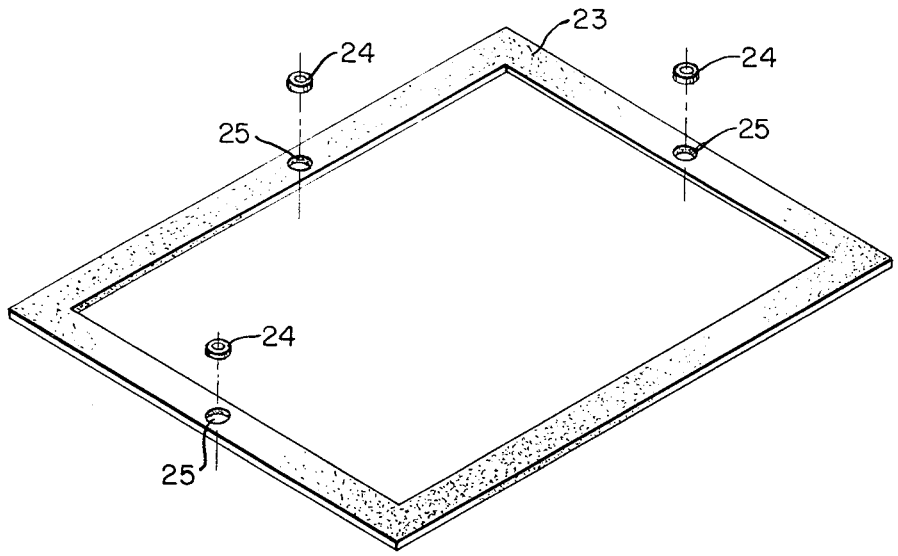
FIG. 7 is a perspective view of a gasket employed with the container of the present invention.
Figure 8:
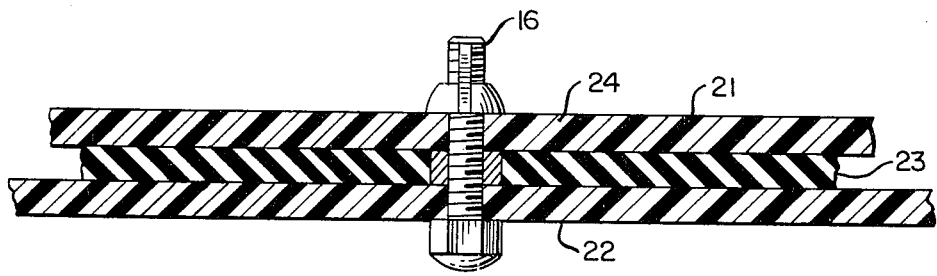
FIG. 8 is an enlarged section disclosing the manner of securing the spacer washer and gasket between certain portions of the components employed in the formation of the container.

The cover 11 is dished as at 20 so as to provide a space in the upper portion of the cabinet for the storage of replacement parts, etc., for the instruments housed within the container in a manner to be more fully described hereinafter. Extending about the peripheral edges of cover 11 are flanges 21, and as best seen in FIGS. 3 and 4 of the drawings, the cover flanges 21 are adapted to cooperate with peripheral flanges 22 which are provided at the upper portion of the wall sections forming the body of the container. The formation of the aforementioned flanges 21 and 22 provides a means for forming a substantially air and/or oil or water-tight connection between the cover and the walls of the container. Disposed on the upper surface of the flanges 22 of the walls of the container and secured thereto by means of a suitable adhesive is a gasket 23 which extends completely around the area defined by the flanges 22. The use of a neoprene gasket is preferred but it is obvious a gasket made of other suitable resilient material may be employed. As best seen in FIGS. 7 and 8 of the drawings, spacer washers 24 are disposed in openings 25 which are formed along three sides of the gasket for a purpose to be more fully described hereinafter. Referring now more particularly to FIG. 7 of the drawings it will be observed that openings are provided in but three of the four sides of the gasket. This type of gasket formation is employed in containers constructed as is shown in FIGS. 1 and 3 of the drawings where the hinge section 12 extends along one side of the container. In such a construction, it will be noted that the cover 11 is retained in a closed position by means of the bolts 16 and wing nuts 17 which are provided at the three sides of the container, and by tightening of the wing nuts on their respective bolts, the cover 11 is forced downwardly upon the gasket 23 to effect a seal of the parts at this portion of the container. However, the spacer washers 24 which can be made of metal, plastic, etc., are of a thickness somewhat thinner than the gasket 23 so that the downward travel of the cover 11 is restricted since the spacer washers which are non-compressible will permit for the flange part of the cover to compress to some extent the resilient gasket but will prevent the flanges from fully compressing the gasket which is undesirable since once a gasket has been fully compressed and left to remain in this fully compressed condition for some period of time, the gasket looses some of its resiliency and its effectiveness to form a proper seal between the parts is destroyed. Thus, the spacer washers aforesaid serve to lengthen the life of the gasket since it prevents a complete compression of the gasket with resultant ruination of the same for the reasons set forth above.

The upper portion of the front, rear and side walls of the container are formed with a ledge 26 which extends completely around the container and serves to support a transparent plate 27 formed of any suitable material. Interposed between the plate 27 and the ledge 26 is a gasket 23' formed in the same manner as that previously described with spacer washers placed therein for the purpose described previously, and the transparent cover is held in place by means of a wing nut arrangement shown generally at 28 in FIGS. 3 and 4 of the drawings.

The container structure described above sets forth a construction for a hinged cover at the upper portion of a container with means for securing the cover to a flange which extends around the periphery of the container and to insure a dust, oil and water-free connection between the cover and the container walls.

The flanges 21 on the cover and the flanges 22 on the walls of the container are provided so that an area will be available for the placement of the gasket between these parts, and the ledge 26 at the upper portion of the walls will likewise present a surface for the reception of a gasket which is interposed between it and the transparent cover or plate without diminishing the area 29 which serves to house the measuring and/or testing instruments, one such instrument being shown schematically at 30 in FIG. 3 of the drawings.

Figure 5:
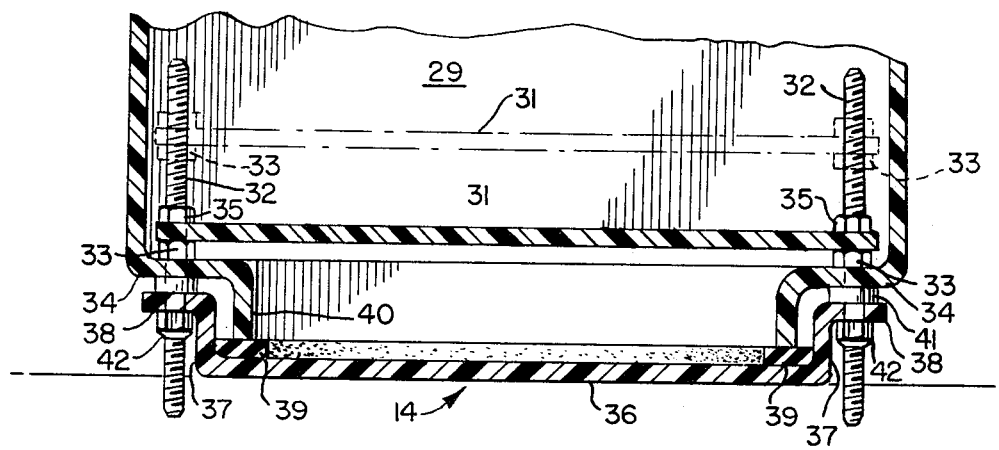
FIG. 5 is a sectional view taken on line 5—5 of FIG. 3, looking in the direction of the arrows.
Figure 6:
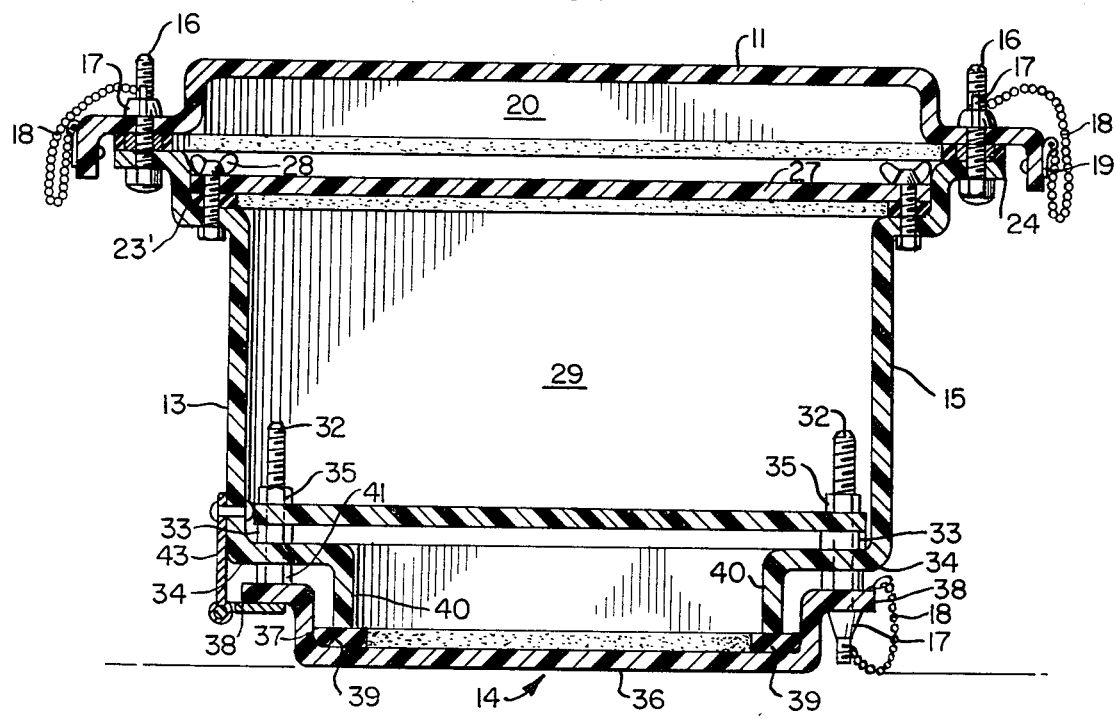
FIG. 6 is a sectional view disclosing the manner in which the bottom cover can be hinged to the container.

Referring now more particularly to FIGS. 5 and 6 of the drawings, there is shown therein the manner of supporting an instrument within the enclosure and yet providing for a means whereby the supporting plate for the instrument may be varied in height within the container. Supporting plate 31 may be formed of any suitable material such as Fiberglas and the like and is supported within the instrument-housing area 29 in the following manner. Elongated externally threaded bolts 32 extend inwardly of the housing area 29 and through suitable openings formed in the supporting plate, and a lock nut 33 is positioned between an inwardly extending flange 34 and the supporting plate 31. It should be pointed out that the support plate 31 is provided with suitable openings therein for the reception of the various measuring instruments which are to be supported thereby when placed within the confines of the housing area 29.

In certain instances where it is desired to place the instrument at a position closely adjacent the transparent plate 27, the nuts 35 on the elongated bolts 32 are retracted and when the plate is in its desired supporting position, the bolt nuts 33 are advanced upwardly as shown schematically in FIG. 5 of the drawings and nuts 35 are then tightened to secure the support plate in its elevated position. The adjustability of the supporting plate is desirable, particularly in cases where, for instance, by reason of the dimensions of the instrument to be supported thereby, it becomes necessary to support the instrument at different heights within the container. Thus, it can be appreciated that the supporting plate can have mounted thereon instruments of various dimensions, and with the reading faces of the instruments mounted on the plate facing the transparent plate 27 at the upper end of the container, one may readily observe the readings of the instruments by the mere opening of the cover 11, and by reason of the construction aforesaid, the instruments within the container are never exposed to any deleterious elements which may cause corrosion of the instrument parts, or admit dust or other undesirable elements within the area confining the instruments.

The bottom closure 36 for the container may take several forms, one such form being shown in FIG. 5 of the drawings wherein the bottom closure comprises a Fiberglas closure formed in the manner aforesaid and is provided with an upwardly extending peripheral wall 37 which terminates in a horizontally extending flange 38. A gasket 39 of neoprene or like resilient material is secured in any known manner to the inside of the bottom closure 36. A downwardly extending wall section 40 of the drawings could be hinged on the container in the manner previously described with respect to the disclosure of FIGS. 3 and 4 of the drawings, thus providing a container having multiple hinged covers, the top cover functioning in the manner described for FIGS. 3 and 4 and the hinged bottom closure 36 of the container shown in FIG. 6 making readily accessible the rear portions of the instruments mounted on the supporting plate 31. This is desirable particularly where access is required to the bottom or rear portion of the container for the repair of the instruments, should the need arise for such repairs to be made.

Figure 9:
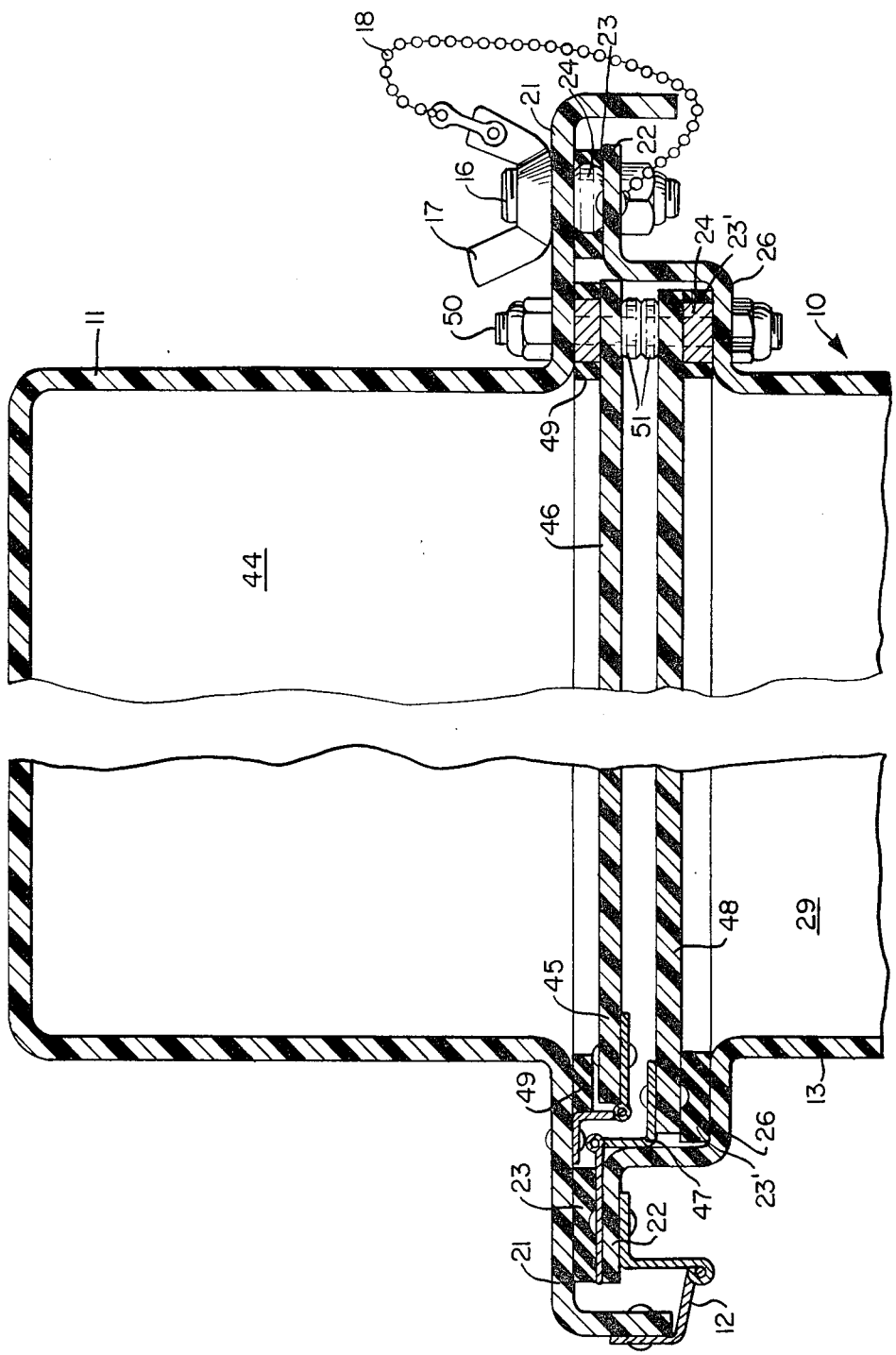
FIG. 9 is an enlarged sectional view of a modification of the present invention.

Referring now to FIG. 9 of the drawings, there is shown therein a further modified version of the present invention. In this modified form, the cover 11 is of shallow structure and is intended to be used primarily as a storage space for measuring and/or testing instruments and/or parts thereof. As can be appreciated, the area 44 within the cover is of appreciable depth to afford the storage area for the above. A hinge 12 extending along one upper edge wall portion mounts the cover to the container. The flanges 21 on the cover 11 are adapted to serve in substantially the same capacity as described previously with respect to the container structure previously described except that in this modification of the invention, a hinge 45 is secured in any known manner to the undersurface of flange 21 and secures a partition 46 to the cover 11. Also, a second hinge 47 secures a second partition 48 within the container 10. In certain instances, it may be desirable that the partitions be made of a transparent material, and in such instances, the partitions may be made of plexiglass or like transparent material. Again referring to FIG. 9, a gasket 23 is interposed between the flange 21 on the cover 11 and a flange 22 which extends from the rear wall 13. The gasket may be made of neoprene or any other resilient sealing material and the same is applied to the undersurface of the flange 21 and secured thereto in any known manner as with adhesive and the like. A gasket 49 of neoprene or like resilient material is secured in any known manner to the undersurface of the flange 21 intermediate the flange 22 and the hinged partition 45. A ledge 26 extends outwardly from the walls of the container and a neoprene or like material gasket 23' is adhesively or otherwise affixed to the ledge 26 intermediate the partition 48 and the ledge 26. A threaded bolt 50 extends through suitable openings formed in the flanges 21 and 26 and through the openings formed in the gasket 23' and 49. Spacer washers 24 are placed in the openings in the gaskets to limit the amount of compressive forces which one can apply to the gaskets for the reasons set forth previously. Similarly, a spacer washer 24 extends in openings formed in gasket 23 through which extends a threaded bolt 16 on which is threaded a wing nut 17. Partitions 46 and 48 are maintained in spaced relationship to one another by means of spacer rings 51 mounted on the bolt 50 as clearly shown in FIG. 9 of the drawings. As can be appreciated, bolts 50 and 16 (only one shown in FIG. 9) are provided on all sides of the container except the side of the container to which the hinge is applied. The container shown in FIG. 9 of the drawings presents numerous advantages in that the storage compartment 44 offers ample space for storing spare instruments or parts, and by reason of the fact that this portion of the container is rendered air, water, oil or dust-free in the manner previously described, the stored instruments or parts are not exposed to deleterious elements such as mentioned, thus avoiding corrosion of the stored items. Of course, to gain access to the interior of the container of FIG. 9 of the drawings, one must remove the upper-most nut on bolt 50 and likewise remove the wing nut. While not shown, the bolts 50 and 16 are offset to one another so that the same will be made readily available for manipulation to open and/or close the container closure. As stated previously, the modification of FIG. 9 is concerned primarily with the upper portion only of the container and the same can readily be adapted to the type of container shown, for example, in FIGS. 3 to 6, inclusive, of the drawings.

It should be pointed out that in instances where a gasket is interposed between any of the hinged portions of the container such as the top cover and/or partitions, the same is construted such as shown in FIG. 7 of the drawings with openings formed along three sides thereof with the hinged side of the gasket remaining free of any openings. However, in installations such as shown in FIG. 6 of the drawings, openings are formed in all sides thereof so that the threaded bolt members can extend therethrough in securing the cover to the container. The gasket employed at the bottom closure of the container such as shown in FIGS. 5, 6 and 7 is one devoid of any of the aforementioned openings since in this type of a closure the sealing effect for this portion of the container is the downwardly extending section 40 which is brought down to bear on the gasket positioned therebelow and the compressive forces applied to the gasket are regulated by the spacer washers 41 which are placed between the inwardly extending flange 34 and the horizontal flange 38.

From the foregoing, it will be apparent that a container construction has been devised which will enable the same to house various type instruments such as measuring and/or testing instruments and the like, including parts thereof, and to completely seal the container, thus excluding the entry thereinto of any deleterious elements which could in time cause a malfunction of the said instruments due to their exposure to salt water, petroleum fumes, dust, etc. The novel arrangement of the sealing means between the parts is unique in that the said sealing elements are so positioned in the upper portion of the container that the entire area for housing the instruments is left clear and free of any protrusions, thus affording the entire housing area for the placement of instruments therein.

As stated previously, the container of the present invention is intended primarily to house delicate instruments which are employed in areas or environments having deleterious elements present which would adversely affect the working parts of the instruments. For instance, instruments employed on board sea going ships are constantly exposed to the corrosive action of sea water if the instruments are left unprotected and in a very short period of time such instruments must necessarily be serviced to remove the corroded parts and either replace or repair the same. Or, if measuring and/or testing instruments used in oil fields are left exposed to the elements, sulphurous fumes in this environment will quickly affect the working parts of such instruments with resultant replacement or repair of such instruments. Of course, the same applies to instruments which are left unprotected from the damaging effects of a dusty environment where, again, the dust particles filtering into the working parts of the instruments will ultimately necessitate the repair and/or replacement of the affected parts. Thus, it will be apparent that it is imperative that a suitable container be provided to house such instruments and to insure their isolation from various deleterious elements which could impair their working condition. The present container provides a receptacle which will by reason of the gasket arrangement, house instruments therein to the exclusion from therein of any outside deleterious elements which could cause corrosion of the parts of the instruments or for any other reasons impair the proper working of the parts thereof. Of course, as set forth previously, the container being formed of a suitable plastic material will adapt the same to be used efficiency in environmental areas containing the aforesaid and other pollutants.

The invention has been described in considerable detail in order to comply with the patent laws by providing a full disclosure of the preferred embodiments of the invention. However, such detailed description is not intended in any way to limit the broad features or principles of the invention or the scope of the patent, and the appended claims are to be resorted to for a comprehensive study of the scope of the invention.

What I claim is:

1. A container for instruments including a housing for said instruments, a supporting plate within said housing for mounting said instruments, said supporting plate adjustably mounted within said housing, a top cover for said container, said cover extending beyond the area defined by said housing and engaging with gasket means mounted on the upper portion of the wall sections forming said container, non-compressible resisting elements mounted within said gasket means and separate and independent from said gasket means whereby when said cover is closed on said container, said non-compressible resisting elements will limit the downward movement of said cover on said gasket.

2. The structure recited in claim 1 wherein a transparent plate is mounted on a ledge in the upper portion of said housing and said plate engages with a gasket on said ledge and said gasket having non-compressible resisting elements therein for limiting the downward movement of said plate on said gasket.

3. The structure recited in claim 2 wherein a removable cover is provided at the bottom of the container, said bottom cover engaging with a gasket means interposed between said cover and depending portions of the walls forming the container with means limiting the compressive forces applied to the closure when securing the same to the container.

4. The structure recited in claim 1 wherein a first hinged partition plate is secured to said cover and a second hinged partition secured to housing with gasket means interposed between said first hinged partition plate and said cover and between said second hinged partition plate and said housing and compressive resisting elements mounted within said gasket means whereby when said partitions are secured to said cover and to said housing, said compressive resisting elements will limit the movement of said partitions toward said cover and said housing.

5. The structure recited in claim 3 wherein a bottom cover is hinged to said housing.

References Cited
UNITED STATES PATENTS

| | | | |
|---|---|---|---|
| 2,461,989 | 2/1949 | Le Roy | 220—82 |
| 3,407,662 | 10/1968 | Tarbox | 220—82 X |
| 940,416 | 11/1909 | Young | 312—283 X |
| 2,522,964 | 9/1950 | Rowe | 220—46 X |
| 2,532,328 | 12/1950 | Penning | 220—46 |
| 3,459,463 | 8/1969 | Nacht | 312—296 |
| 3,515,046 | 6/1970 | Ippolito et al. | 220—82 X |
| 3,530,723 | 9/1970 | Hogue et al. | 220—82 R |

JAMES T. McCALL, Primary Examiner

U.S. Cl. X.R.

220—46, 82; 312—291